(12) United States Patent
Schweitzer, III

(10) Patent No.: US 8,643,215 B2
(45) Date of Patent: Feb. 4, 2014

(54) MOBILE AUXILLIARY POWER SYSTEM FOR ELECTRICAL DISTRIBUTION AND TRANSMISSION SYSTEMS

(75) Inventor: Edmund O. Schweitzer, III, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 926 days.

(21) Appl. No.: 12/721,378

(22) Filed: Mar. 10, 2010

(65) Prior Publication Data

US 2010/0231040 A1  Sep. 16, 2010

Related U.S. Application Data

(60) Provisional application No. 61/159,180, filed on Mar. 11, 2009.

(51) Int. Cl.
*H02J 9/00* (2006.01)
(52) U.S. Cl.
USPC .......................................................... 307/64
(58) Field of Classification Search
USPC .......................................................... 307/64
See application file for complete search history.

(56) References Cited

U.S. PATENT DOCUMENTS

| 5,065,581 | A | 11/1991 | Jenkins |
| 6,239,997 | B1 | 5/2001 | Deng |
| 2006/0224336 | A1 | 10/2006 | Petras |
| 2010/0038228 | A1* | 2/2010 | Heres et al. ................. 200/81 R |
| 2011/0047627 | A1* | 2/2011 | Sheymov ........................ 726/26 |

OTHER PUBLICATIONS

M. Lin, R.K. Rayudu, S. Samarasinghe, A Review of Voltage/VAR Control, Center for Advanced Computational Solutions Lincoln University, Sep. 1, 2003.
Daniel Trudnowski, Matt Donnelly, Eric Lightner, Power System Frequency and Stability Control using Decentralized Intelligent Loads, 2005.
Anthony Johnson, Rovert Tucker, Thuan Tran, John Paserba, Dan Sullivan, Chris Anderson, Dave Whitehead, Static Var Compensation Controlled via Synchrophasors, Sep. 18, 2007.
PCT/US2010/026848, Patent Cooperation Treaty, International Search Report and Written Opinion of the International Searching Authority, May 4, 2010.

* cited by examiner

*Primary Examiner* — Rexford Barnie
*Assistant Examiner* — Dru Parries
(74) *Attorney, Agent, or Firm* — Richard M. Edge

(57) ABSTRACT

A system, apparatus and method for increasing the reliability of an electric power transmission or distribution system by injecting controlled electric power into the transmission or distribution system using mobile electric power sources. The mobile electric power source may be a locomotive engine. The mobile electric power source may be controlled using an IED. The mobile electric power source may be controlled to provide active power or reactive power or act as a governor or exciter to the electric power transmission or distribution system.

20 Claims, 9 Drawing Sheets

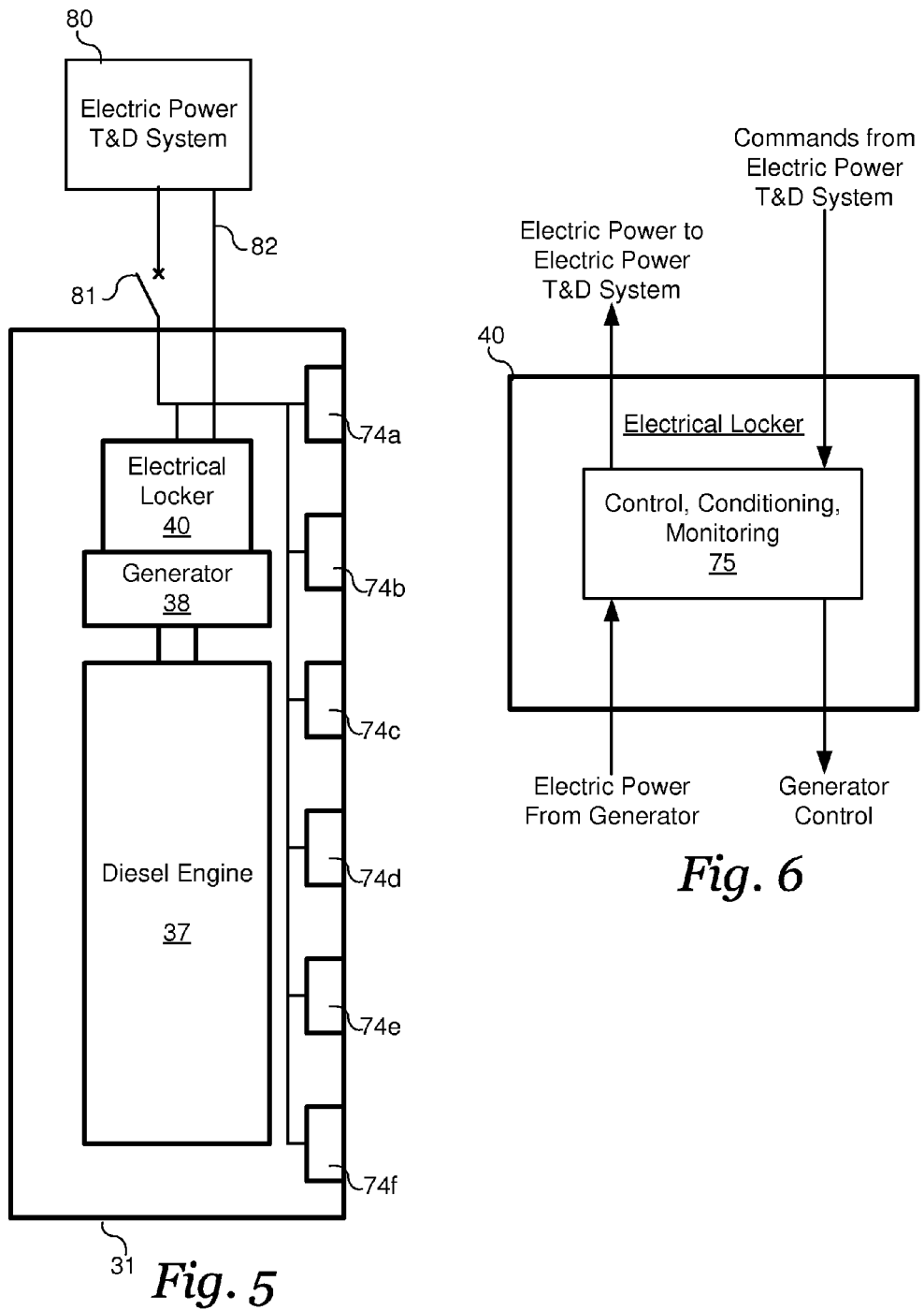

MOBILE AUXILLIARY POWER SYSTEM FOR ELECTRICAL DISTRIBUTION AND TRANSMISSION SYSTEMS

RELATED APPLICATION

This application claims benefit under 35 U.S.C. 119(e) of U.S. Provisional Application No. 61/159,180 entitled "Mobile Power System Injection Units", filed Mar. 11, 2009, naming Edmund O. Schweitzer III, as inventor, the complete disclosure thereof being incorporated by reference.

TECHNICAL FIELD

This disclosure relates to mobile power systems for electrical power distribution and transmission systems. More particularly, this disclosure relates to systems and methods whereby railroad locomotives can be used as auxiliary sources for providing electrical power to an electrical power transmission or distribution system.

DESCRIPTION OF THE PRIOR ART

Modern society has an ever growing need for electrical power. Numerous systems and methods exist in the prior art for generating electrical power. Presently, the majority of electrical power is generated by burning fossil fuels, such as coal or oil. Other power generation means such as nuclear power plants, wind farms, and solar cell arrays are used as well. Certain other power sources, such as wind and solar, are intermittent, and only capable of providing power as they are available which availability does not necessarily track the demands of power utilities for additional electrical power.

One method of generating power, and various attempts to address some of the shortcomings of earlier power generation methods and systems are detailed in U.S. Pat. No. 5,065,581. This patent describes utilizing diesel railroad locomotives as additional generation capacity during the time that they are running idle at a train yard. However, this reference does not adequately address the difficulties in actually connecting diesel generators to the power grid. Accordingly, there is a need for a system and method for safely connecting one or more diesel locomotives to the power grid to provide power as needed by the grid, without disrupting existing power generation equipment or causing damage to the diesel locomotives.

SUMMARY OF THE INVENTION

The disclosed invention achieves its objectives by providing a peaking power system based on an idling locomotive. The locomotive includes a diesel engine coupled to a generator that provides one or more three-phase outputs through a plug. A cable couples the generator to a connection system, such as a track-side facility or a rail car. The connection system includes a second plug coupled to the input of a first circuit breaker, a rectifier, whose input is coupled to the output of the first circuit breaker, a DC chopper, whose input is coupled to the output of the rectifier, an inverter, whose input is coupled to the output of the DC chopper, a power transfer, whose input is coupled to the output of the inverter, a second circuit breaker, whose input is coupled to the output of the power transformer, and a third plug coupled to the output of the second circuit breaker, and also coupled to a power system. The power transformer is designed to convert the output of the inverter to the correct level for the power system.

The connection system also includes an intelligent electronic device that monitors the voltage level at the input of the first circuit breaker, the input of the second circuit breaker, and the output of the second circuit breaker. It does this to ensure that (1) the generator is producing power usable by the power stage, (2) the power stage is producing power usable by the power system, and (3) the output of the power stage is at a level appropriate to connect to the power system. If all three conditions are met, and it is desired that the peaking power system provide power to the power system, the intelligent electronic device will operate the circuit breakers to connect the peaking power system and the power system. If any of the conditions fail to be met, the intelligent electronic device will disconnect the peaking power system from the power system.

BRIEF DESCRIPTION OF THE DRAWINGS

Non-limiting and non-exhaustive embodiments of the disclosure are described, including various embodiments of the disclosure with reference to the figures, in which:

FIG. 5 is a simplified block diagram of one embodiment of a railroad locomotive connected to supply power to an electric power transmission and distribution system;

FIG. 6 is a simplified block diagram of the electrical locker of a railroad locomotive connected in accordance with the embodiment of FIG. 5 to supply power to an electric power transmission and distribution system;

DETAILED DESCRIPTION

Electric power transmission and distribution systems are typically designed to deliver electric power from a point of generation to various loads located at a distance from the point of generation.

Figure 1:
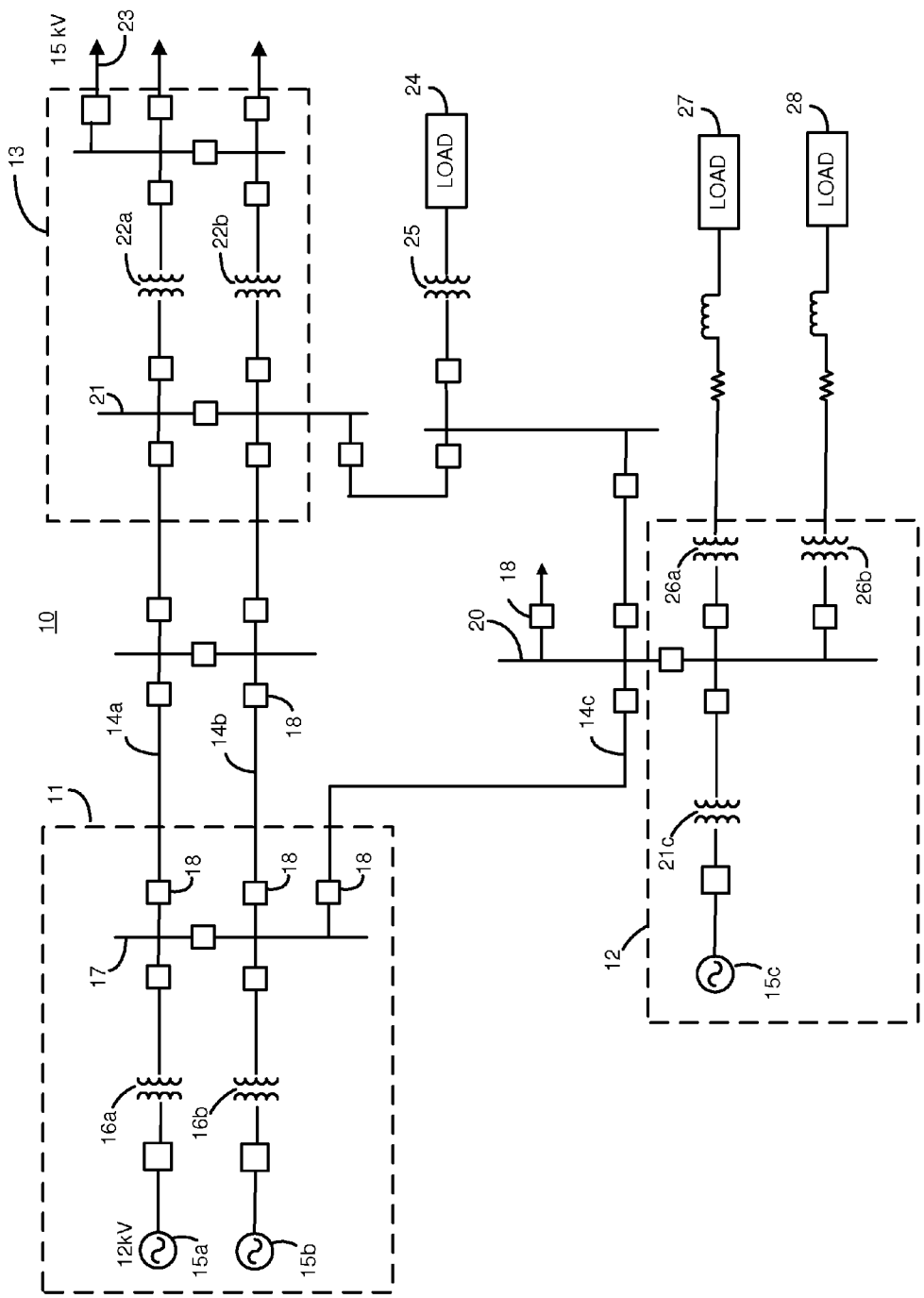
FIG. 1 is a one-line diagram of a typical electric power transmission and distribution system.

FIG. 1 is a one-line diagram of a typical electric power transmission and distribution system 10. The system includes three substations 11, 12, 13, interconnected by transmission lines 14a, 14b, and 14c. Substation 11 includes two 12 kV generators 15a and 15b. Power from generators 15a and 15b is stepped up in voltage using step-up transformers 16a and 16b, delivered to bus 17, and supplied to transmission lines 14a, 14b, and 14c. At various points along the path circuit breakers 18 are included to allow for portions of the electric power transmission and distribution system to be disconnected. Likewise, substation 12 includes a 12 kV generator 15c connected to a step-up transformer 21c, to provide electric power to a bus 20.

At the other end of transmission lines 14a and 14b a substation 13 includes a bus 21. The high-voltage electric power transmitted to substation 13 is stepped down to a lower (distribution) voltage level by transformers 22a and 22b, and provided to loads via distribution lines 23. A load 24 is likewise provided with electric power via bus 21 and a step-down transformer 25.

Bus 20 of substation 12 is provided with high-voltage electric power. The electric power is then stepped down to acceptable levels using transformers 26a and 26b before being delivered to loads 27 and 28 on the electric power distribution system.

As the loads of the distribution system grow, more is required of the transmission system to provide adequate power. As a result of growing demand, the lack of adequate generation, and/or the unpredictability of certain loads, active and reactive power supplies can reach their operational limits. Consequently, additional sources of active and reactive power are needed to supply the demand of the transmission and distribution system.

Supply of active or reactive power may be greater in some geographical areas than it is in others. Further, because reactive power does not travel great distances well, it is often necessary to inject reactive power nearer to the loads that consume such power.

Additionally, as electric power transmission and distribution systems approach their operational limit, system frequency may fluctuate outside of acceptable limits. When this happens, additional governors/exciters may be used to control the frequency as needed.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, or other software instrumentality, that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Modern railroad locomotives are powered with large diesel engines that provide mechanical energy to a three-phase electrical generator that in turn provides electric power to traction motors. The traction motors transform applied electrical power into mechanical power to move the locomotive.

The diesel engines used in railroad locomotives are often left running when the locomotive engine is not being used to pull railroad cars. Accordingly, the diesel engine of the locomotive is frequently available as an auxiliary source of electric power according to the present invention.

Figure 2A:
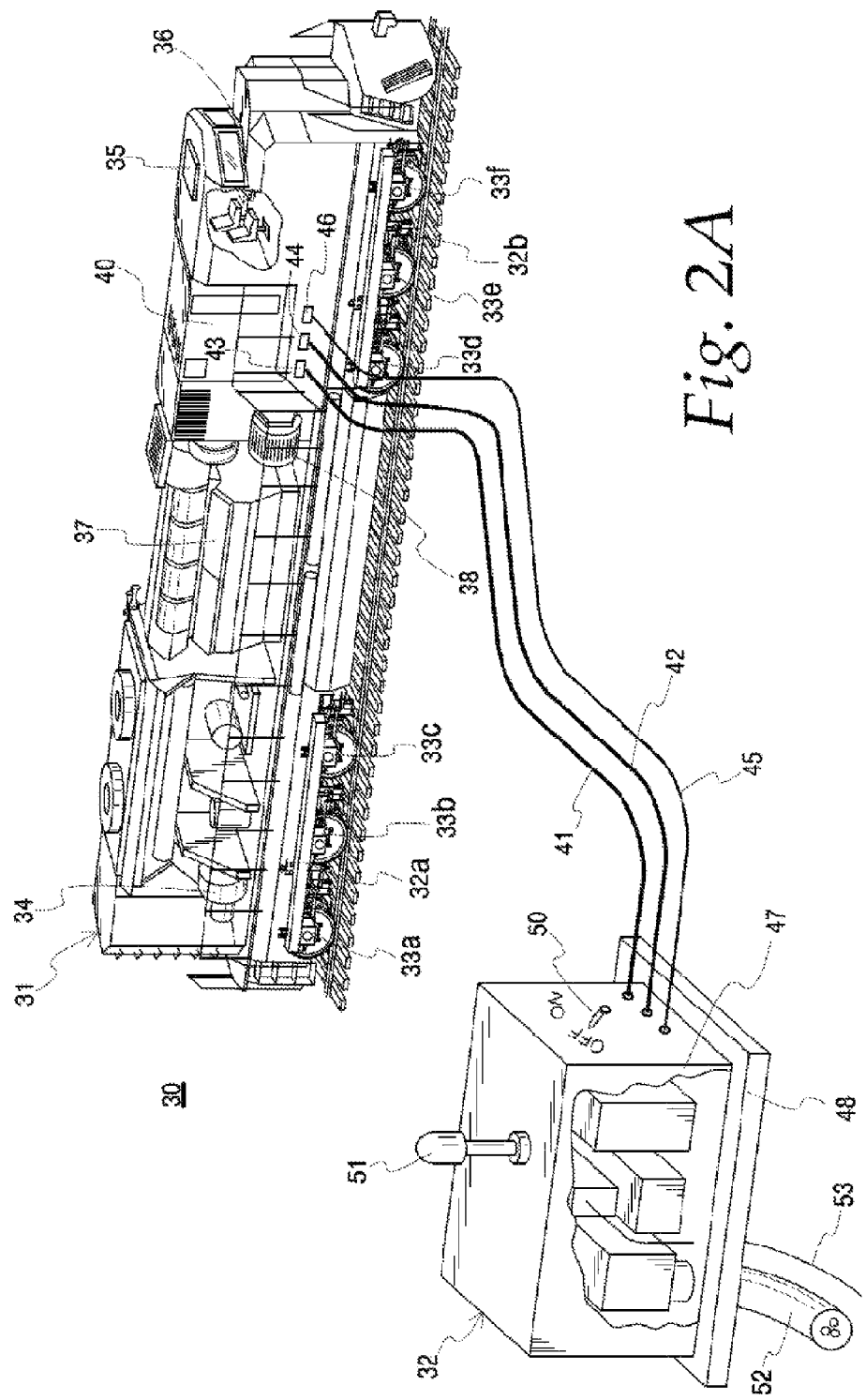
FIG. 2A is a perspective view of a power peaking system constructed in accordance with the invention showing a locomotive coupled to a track-side power conversion and interface unit.

FIG. 2A is a perspective view of the auxiliary power system 30 of the invention showing a diesel railroad locomotive 31 and a utility interface unit 32. The locomotive 31 includes two bogies 32a and 32b, on which are mounted a number of rail compatible wheels. Each wheel along with its opposing wheel (not shown) is powered by respective traction motors 33a-f. The traction motors are cooled by multiple blowers 34 (additional blowers not depicted). A GPS/cellular antenna 35 is mounted on the top of the locomotive 31 above a control cab 36, where the engineer sits. Using the GPS and cellular antenna the position of the locomotive is constantly calculated, and can be reported to a monitoring facility. A diesel engine 37 is coupled to a generator 38, which generates three-phase electrical power. The output of generator 38 is conditioned by circuitry within an electrical locker 40.

In accordance with the invention, the two three-phase outputs of generator 38 are connected by respective three conductor cables 41 and 42 to interface unit 32. Respective heavy duty connectors 43 and 44 are disposed at the locomotive end of the cables to allow the cables to be easily disconnected when the locomotive is not being used as an auxiliary power source. In addition, a data cable 45 is provided to enable bi-directional communications between electrical locker 40 and interface unit 32. A connector 46 may be provided to allow this cable to be easily disconnected as well.

Interface unit 32 includes a weather proof enclosure 47 mounted on a pad 48. The various components of the interface are contained within this enclosure. A disconnect switch 50 is preferably provided on the exterior of the enclosure to enable non-technical personnel to unambiguously enable or disable auxiliary power system 30 after and before connecting or disconnecting the cables. A signal lamp 51 is preferably provided to signal when the system is in use.

A connection to an associated electrical distribution system utility may be provided by a three-phase underground cable 52, typically operating at voltage levels of 5 kV to 15 kV. A second low voltage SCADA signal cable 53 may also be provided to coordinate operation of unit 37 with the power system.

Figure 2B:
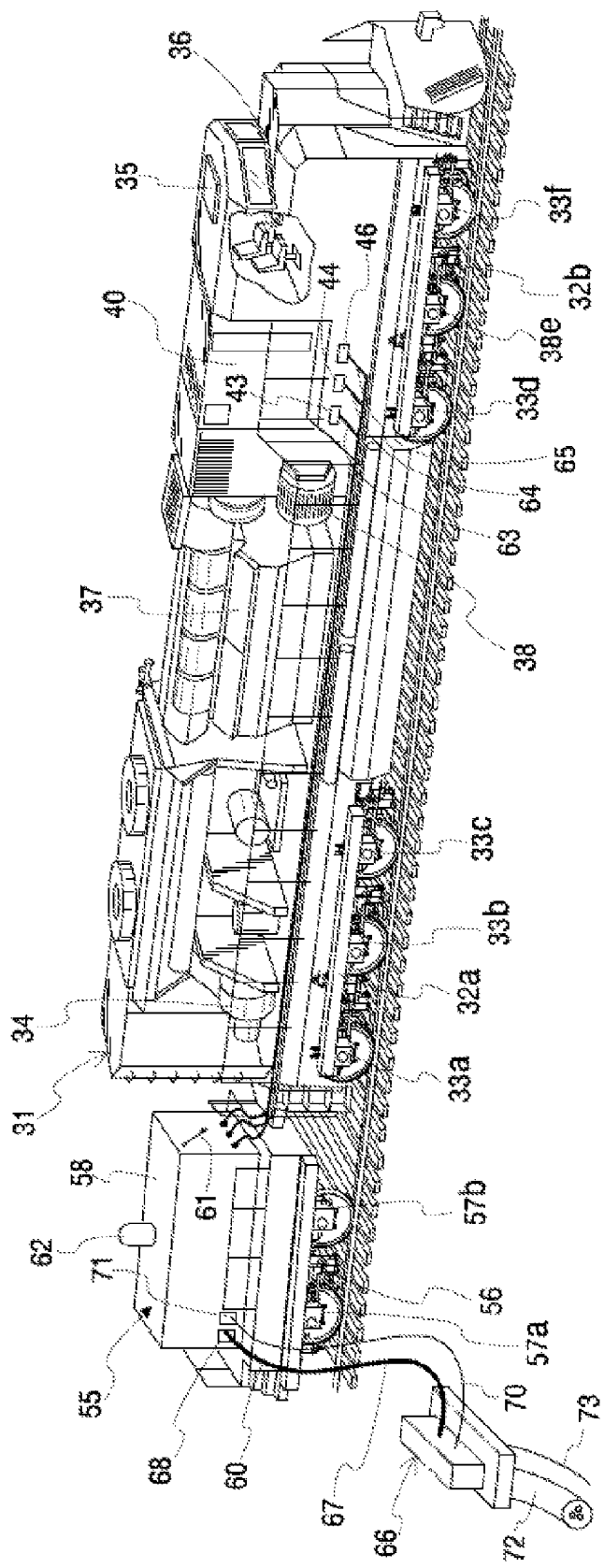
FIG. 2B is a perspective view of a power peaking system constructed in accordance with the invention showing a locomotive coupled to an on-track power conversion and interface unit.

Referring to FIG. 2B, a mobile system interface 55 may alternatively be provided in an auxiliary power system constructed in accordance with the invention. In particular, the interface 55 may be provided with a bogey 56 having rail-compatible wheels 57a and 57b. The unit includes a weatherproof enclosure 58, mounted on a chassis 60. As with the previously described interface unit 32, a control switch 61 may be provided on the exterior of the enclosure and a beacon 62 may be provided in a conspicuous location on unit 55 to signal system operation.

Connections between the two three-phase outputs of generator 38 and interface unit 55 are provided by three conductor cables 63 and 64 connected at their locomotive ends by connectors 48 and 44. In addition a bi-directional control cable 65 is provided for coordination between electrical locker 40 and the control circuitry (not shown) of interface unit 55. This cable is connected to the locomotive by connector 46.

The output of interface unit 55 is connected to a utility connection unit 66 by a three conductor heavy duty cable 67 connected to unit 55 by a connector 68. A bidirectional data cable 70 connected by a connector 71 to unit 55 provided SCADA communication between interface unit 55 and the utility power system to enable coordination. The utility interface may be connected to the power distribution system by a three conductor 5 kV to 15 kV underground cable 72 and an underground SCADA data cable 73.

Figure 3:
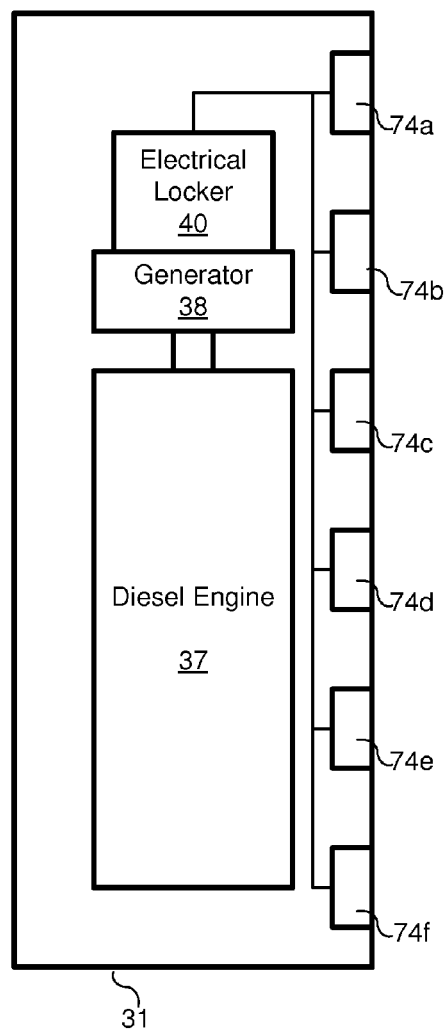
FIG. 3 is a simplified block diagram of the electrical system of a railroad locomotive.

FIG. 3 is a simplified block diagram of the electrical system of the locomotive depicted in FIGS. 2a and 2b. The locomotive includes a diesel engine 37 which turns a generator 38 to transform mechanical energy into electrical energy. The generator 38 may be a three-phase generator, providing two three-phase electrical outputs. The generator 38 is in electrical communication with electrical locker 40. The electrical locker 40 conditions and transmits electrical power to six traction motors 204 74a-74f which work to move the locomotive.

Figure 4:
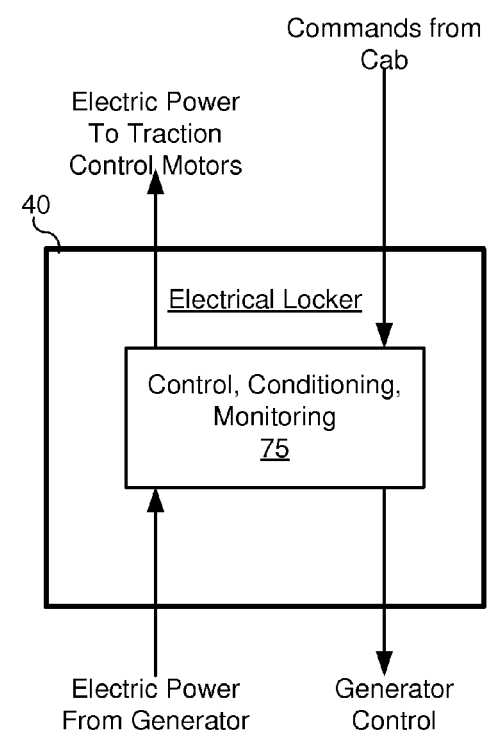
FIG. 4 is a simplified block diagram of an electrical locker of a railroad locomotive.

FIG. 4 illustrates a simplified block diagram of the electrical locker 40. The electrical locker includes a control, conditioning and monitoring module 75. The control, conditioning and monitoring module 75 monitors the electrical power provided by the generator, and conditions the electrical energy to provide the energy to the traction motors 74a-f. As stated earlier, the traction motors may be DC motors, and therefore, the conditioning equipment may include a rectifier, DC chopper, and a DC bus (not depicted). Additionally, the control, conditioning and monitoring module 75 receives control commands and provides control inputs to the generator 38. For example, control commands may be provided from the control cab of the locomotive when more or less power is required from the generator.

The generator 38 includes a stator with stationary windings and a rotor that is rotated by the diesel engine. In a locomotive the rotor includes a magnetic field that, when rotated within the windings of the stator, produces a current. The output of the generator can be modified by changing the speed of rotation of the generator, changing the strength of the magnetic field of the generator, or changing the number of windings. Speed of rotation is changed using a throttle to the diesel engine. Also, the magnetic field, or excitation, of the rotor may be changed by the amount of current that is allowed to run through the windings of the rotor.

According to the present invention, railroad locomotives can be used to supply electric power into an electric power transmission or distribution system at points where the electric power is needed. The locomotive engines can be moved to locations as needed and connected to the electric power transmission or distribution system, or simply connected to the electric power transmission or distribution system at the location where the locomotive engine is stationed.

FIG. 5 illustrates locomotive engine 31 in communication with an electric power transmission or distribution system 80. The electrical locker 40 of the locomotive includes an electrical output that is in communication with the electric power transmission or distribution system 80 via a transfer switch 81. It should be noted that the output may be from the generator 38 itself instead of from the electrical locker as illustrated. Further, the electric power transmission or distribution system 80 may be connected to the electrical locker 40 via a communications interface 82 to provide control commands thereto.

FIG. 6 illustrates in more detail the connection between the electrical locker 40 with the electric power transmission or distribution system 80. The output of the control, conditioning and monitoring module 75 of the electrical locker 40 (provided by the electric generator) is provided to the electric power transmission or distribution system 80 via the transfer switch. Further, control commands from the electric power transmission and distribution system may be transmitted to the generator via the control, conditioning and monitoring module 75. In essence, the generator 38 of the locomotive becomes a supplier of electric power to electrical transmission or distribution system 80.

Figure 7:
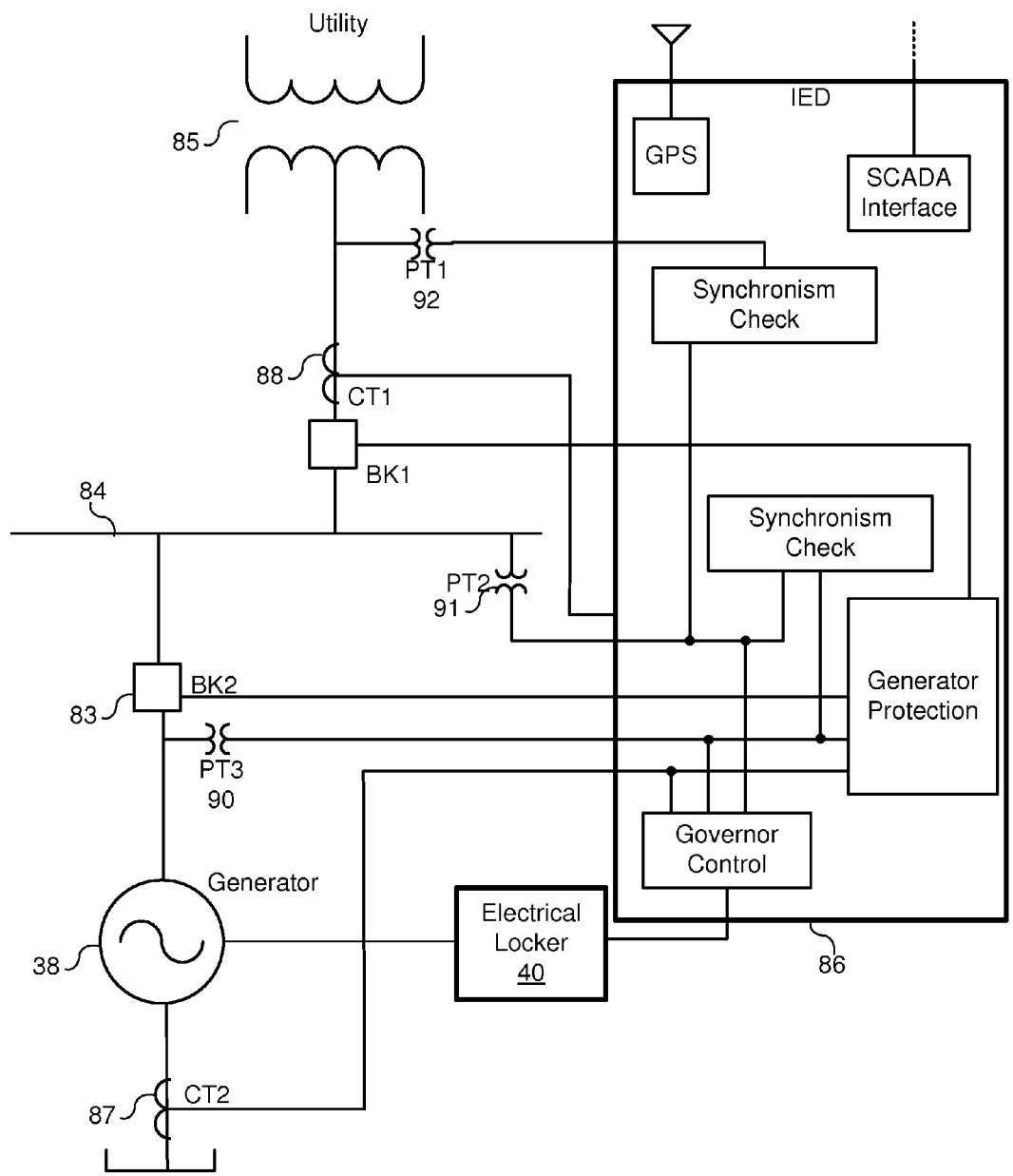
FIG. 7 is a simplified one-line diagram of the power peaking system of FIG. 5 connected to supply power to an electric power transmission and distribution system.

FIG. 7 is a simplified one-line diagram of the locomotive in electrical communication with, and controlled by, the electric power transmission or distribution system 80. A control switch 83 provides electrical communication between the generator 38 of the locomotive and a bus 84. The bus 84 may include various further transfer switches providing electrical communication between several additional generators (of locomotives) and the electric power transmission or distribution system 80. The bus 84 further provides electrical power to the transmission or distribution system using a step-up or step-down transformer 85 as is needed to match the voltage of the electrical power transmission or distribution system 80.

The interconnection between the generator 38 of the locomotive and the transmission or distribution system 80 may be monitored, controlled, and protected using an intelligent electronic device (IED) such as a generator protective relay 86. The generator protective relay 86 may be a model 300G generator protection relay, or one of the various protective intelligent electronic devices available from Schweitzer Engineering Laboratories, Inc. (Pullman, Wash.). The IED 86 receives electric power system information from the generator 38 and the electric power transmission or distribution system using various current transformers (CTs) to obtain current information and potential transformers (PTs) to obtain voltage information. Control and protection decisions may be made by IED 86 and commands given to the generator via the electrical locker 40.

In particular, IED 86 may obtain current and voltage information from the generator using CT 87 and PT 90. Voltage on the bus 84 may be obtained using PT 91. Current and voltage information from the electric power transmission or distribution system is obtained using CT 88 and PT 92.

Figure 8:
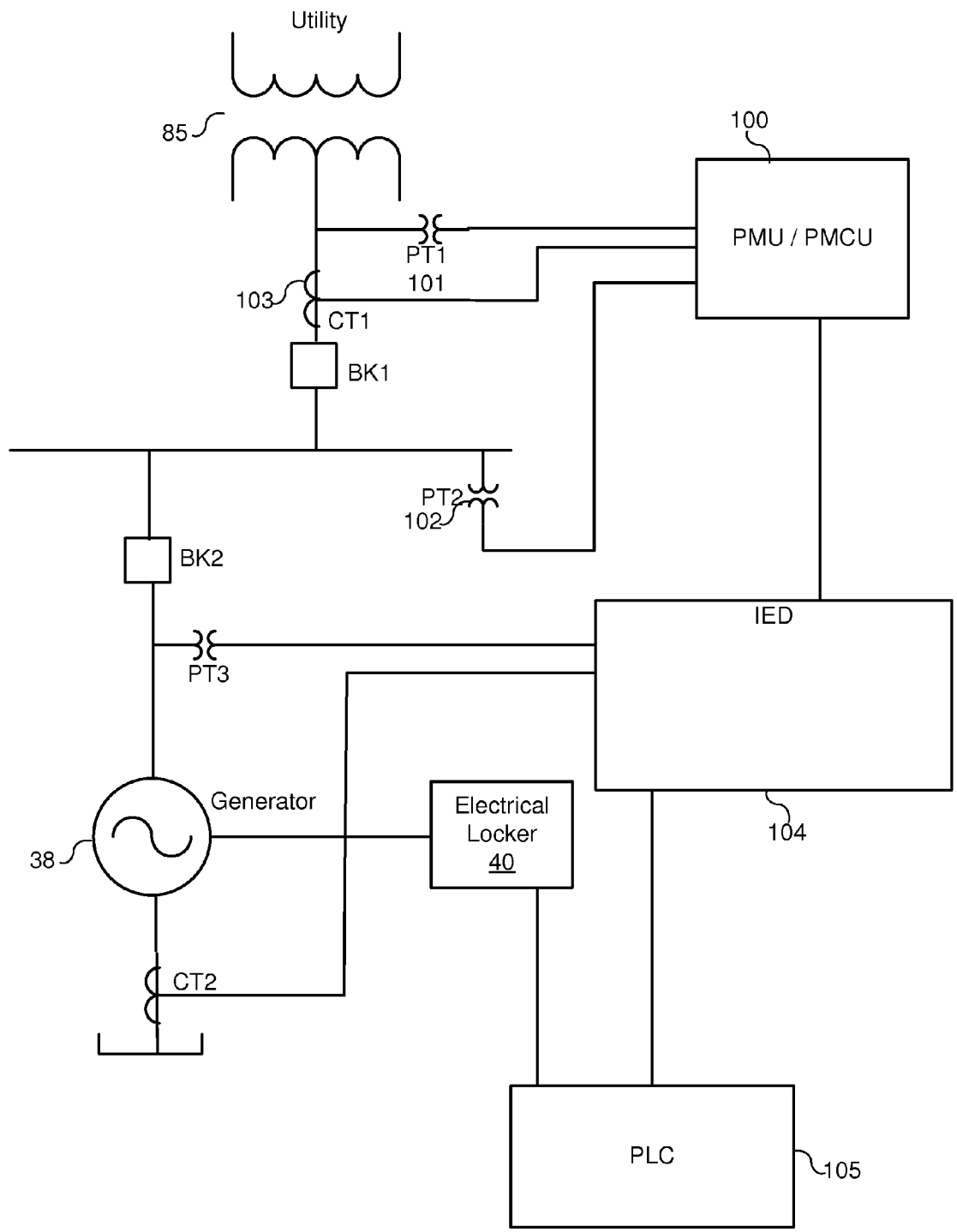
FIG. 8 is a simplified one-line diagram similar to FIG. 7.

FIG. 8 illustrates another configuration wherein power system information from the electric power transmission or distribution system is obtained using IEDs in connection with that system. For example, information may be obtained using a phasor measurement unit (PMU) or a phasor measurement and control unit (PMCU) 100. The PMU/PMCU may obtain electric power system information using PTs 101 and 102, and CT 103. The PMU/PMCU 100 may be configured to produce time-synchronized phasors representative of the power system information, also known as synchrophasors. The synchrophasors may be shared with an IED 104 to assist with the control and protection decisions made by the IED 104.

FIG. 8 also illustrates the use of a programmable logic controller (PLC) 105 in communication with the IED 104. The PLC 105 may be configured to assist with communication of the control or protection decisions from IED 104 and provision of such to the generator 38 via the electrical locker 40.

As discussed above, the electrical power transmission or distribution system may be operating in a condition that would benefit from injection of certain electrical power from mobile sources. One such condition is deviation from rated frequency. The frequency of the generator of the locomotive engine may be controlled using the embodiments of the present disclosure such that the generator 38 acts as a governor or exciter to the electric power transmission or distribution system. In particular, the IED 104 may be configured to calculate the frequency of the electric power transmission or distribution system using the power system information provided thereto (or obtained thereby) using any of the methods to calculate frequency known in the art. The IED 104 may further be programmed to provide control signals to the generator 38 and diesel engine 37 to increase or decrease the frequency thereof as is needed to act as a governor or exciter to the electric power transmission or distribution system.

Alternatively, the IED 104 may be configured to maintain the frequency of the generator at the rated frequency such that the generator 38 acts as a constant governor or exciter to the electric power transmission or distribution system. This may be advantageous in that the frequency of the locomotive generator 38 may not be adjustable on a time scale that would be beneficial to the electric power transmission or distribution system.

Further, the electric power transmission or distribution system may be operating in a condition where additional real power is needed. The IED 104 may be configured to detect such a condition using the power system information obtained or provided thereto. The IED 104 may then be configured to require additional real power be provided by the generator 38. Further, the IED 104 may be configured to detect if the electric power transmission or distribution system is being supplied with too little or too much reactive power. The IED 104 may then be capable of providing control communications to the generator to increase excitation of the generator (thereby supplying reactive power) or decrease excitation of the generator (thereby absorbing reactive power).

Accordingly, the needs of the electric power transmission or distribution system may be met by control of various aspects of the electric power provided thereto by the mobile source (locomotive engine).

Figure 9:
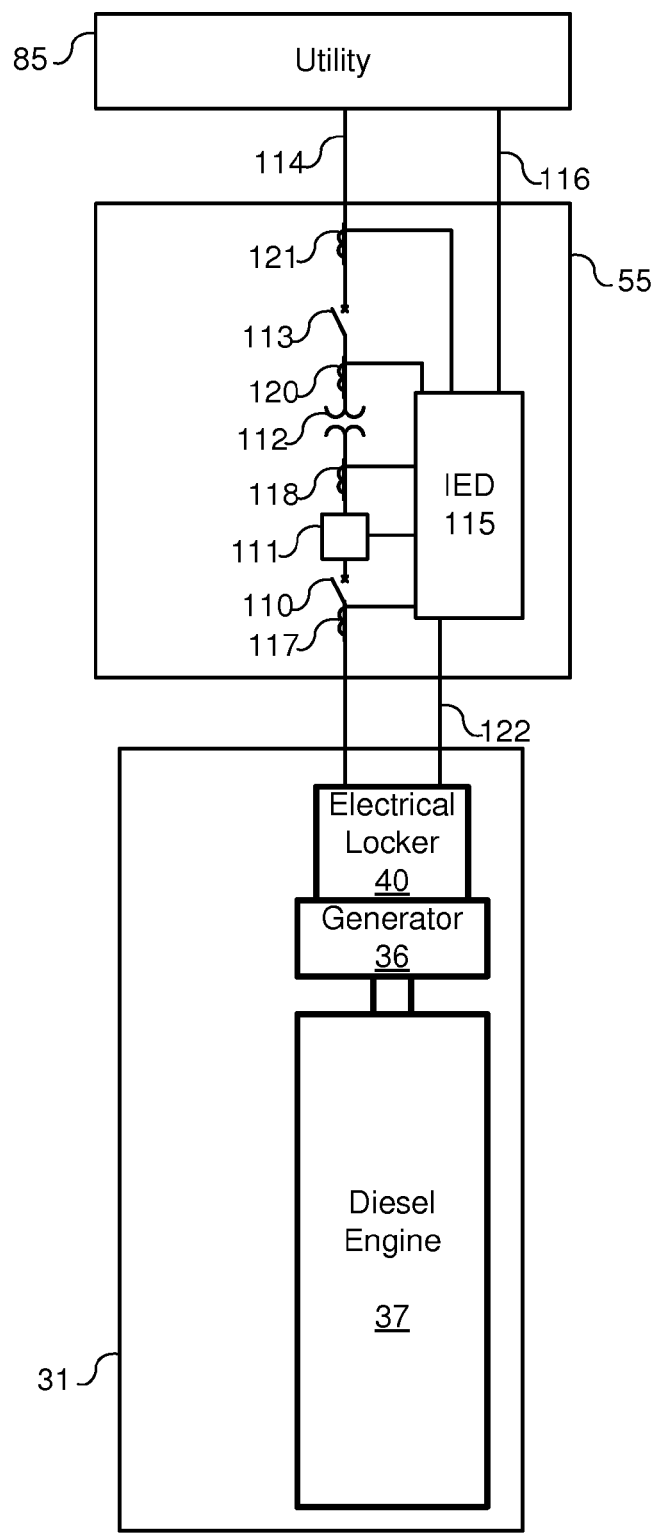
FIG. 9 is a simplified block diagram of a railroad locomotive and an interface unit connected in accordance with the embodiment of FIG. 5 to an electric power transmission and distribution system.

FIG. 9 illustrates a simplified block diagram of another embodiment of the present invention in which the auxiliary power system includes connection car 55 housing the switchgear and intelligent electronic devices needed to interconnect the generator of the locomotive engine to the electric power transmission and distribution system. The connection car may be transported along with the locomotive 31, or may be a mobile unit that stays at the transfer yard where the locomotive engine is connected to the electric power system.

As with other block diagrams, FIG. 9 includes the locomotive 31 with the various components described above. FIG. 9 further includes a connection car 55 that includes the various switchgear and protection devices needed to connect the engine to the transmission or distribution system 85. The connection car 55 includes a first switch 110, a circuit breaker 111, a step-up transformer (to step the voltage up to that of the electric power transmission or distribution system) 112, a second switch 113, and a power conductor configured to connect to the electric power transmission or distribution system 85.

The connection car 55 further includes an IED 115 configured to monitor the electric power on the transmission or distribution system 85, monitor electric power from the locomotive 31, and provide control signals to the locomotive. As described herein, the IED 115 may further be in communication with other IEDs and/or a supervisory control and data acquisition system (SCADA) via a line 116. The IED 115 may receive electric power system information from the electric power transmission or distribution system and the locomotive engine using various CTs and/or PTs 117, 118, 120, and 121. The IED uses the electric power information to perform protection, automation and control calculations and provide control and protection commands to the interconnection.

As is known, when connecting a generator to an electric power system it is important to match the phase of the generated electric power to that of the electric power system. Likewise, it may be beneficial to match the frequency and/or voltage. Accordingly, the IED 115 may be configured to determine the frequency, phase, and/or voltage of the electric power system using CT 121 (and PTs as needed), and that of the locomotive generator using CT 117 (and PTs as needed).

In one example, the connection car and the locomotive engine may be pulled up to a connection point. With switches 110 and 113 open and circuit breaker 111 open, the connection car is connected to the electric power transmission or distribution system 85. Switches 110 and 113 can then be closed with circuit breaker 111 open. The IED 115 is then be capable of calculating frequency, phase, and voltage of both the electric power transmission or distribution system 85 and the locomotive 31. The IED 115 can then send commands to the locomotive engine to increase or decrease the frequency as needed. Once the locomotive and the electric power system are in phase and have matching frequencies, the IED can send a command to the circuit breaker 115 to close allowing electric power from the locomotive engine 200 to be fed to the electric power transmission or distribution system. The IED 115 can then be configured or commanded as indicated above to control the locomotive engine to inject power as needed to the electric power transmission or distribution system.

In one example, the IED 115 may be further capable of providing transformer protection to the step-up transformer 112. Such an IED may be, for example, an SEL-model 387E or SEL-487E transformer protection relay, available from Schweitzer Engineering Laboratories, Inc. The IED 115 may further send information via a cable 122 relating to the transformer to a SCADA system of system 85 and/or a control center of the locomotive or transfer station to indicate the health of the transformer 112.

Figure 10:
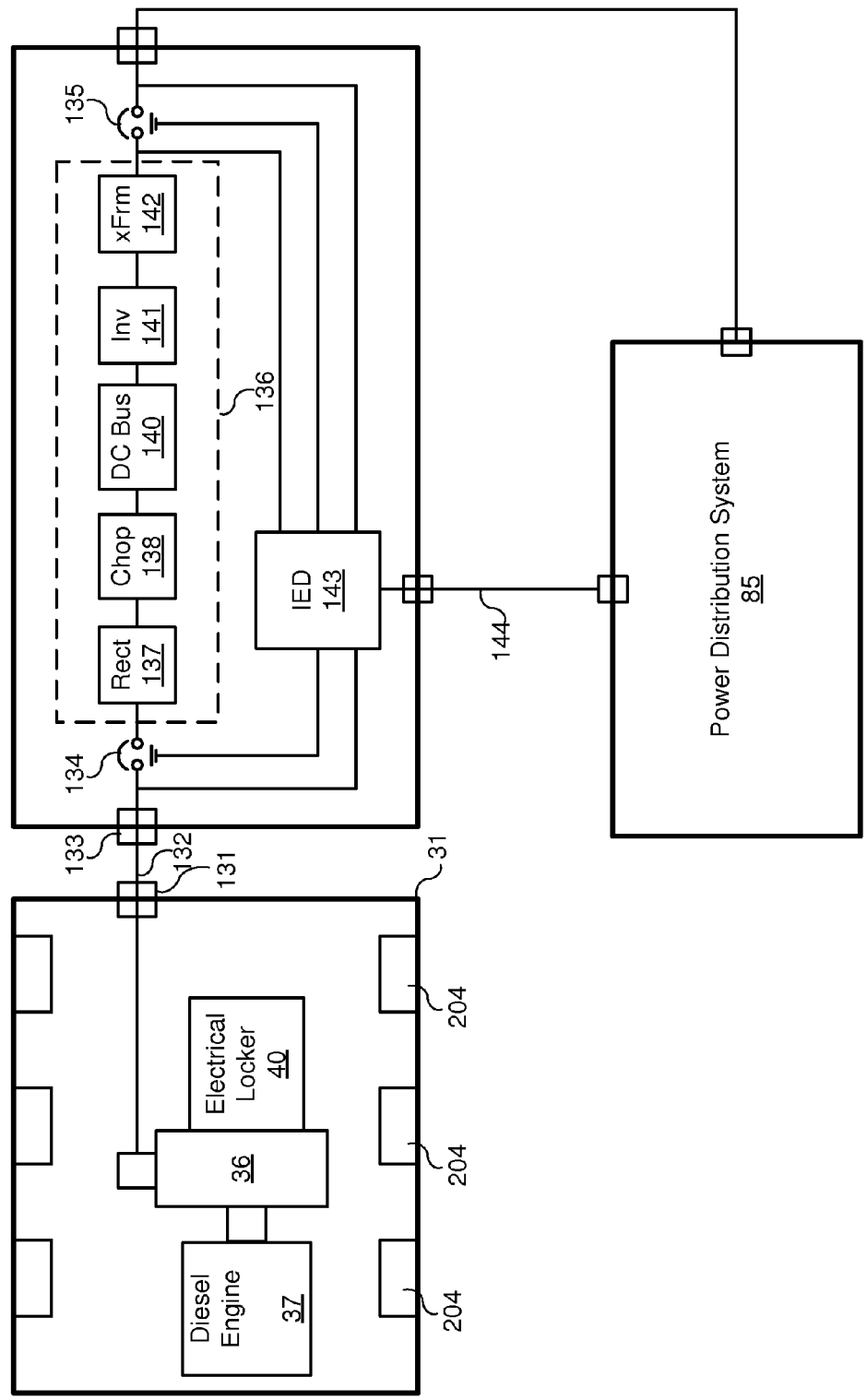
FIG. 10 is a simplified block diagram of a power peaking system constructed in accordance with an alternate embodiment of the invention showing a railroad locomotive connected to an electric power transmission and distribution system.

FIG. 10 depicts another embodiment of the invention wherein the AC output of the locomotive generator is converted to DC power, which is then converted back to AC power for application to the utility power system. The output of the locomotive generator 36 is connected to a connection facility 130 using a first plug 131, a distribution cable 132 and a second plug 133. The distribution cable includes conductors for each power phase of the generator, a neutral conductor, a ground, and a sense conductor, that is used to determine when the locomotive is connected to the connection facility 130. The second plug 133 couples with a first circuit breaker 134, which serves to isolate the input of the connection facility 130 from the locomotive 31. A second circuit breaker 135 serves to isolate the output of the connection facility from the power system 85.

The output of the first circuit breaker 134 is passed through a power stage 136 that comprises a rectifier 137, a DC chopper 138, a DC bus 140, an inverter 141, and a transformer 142. The rectifier 137 converts the AC output of the generator 36 to an unsmoothed DC waveform, which the DC chopper 138 converts to usable DC power. The DC bus 140, which may include a capacitor bank and/or some other form of DC power storage, serves as an energy supply for the three phase inverter 141, which creates a three phase constant frequency power waveform. The transformer converts the voltage level of the three-phase power waveform output by the inverter 141 to a voltage level compatible with the power system, which is typically in the range of 5 kV to 15 kV.

An intelligent electronic device ("IED") 143 monitors the output of the generator 36, the output of the power stage 136 and, via a SCADA connection 144 or the like, the operating level of the power system 36. The IED 143 is also connected to the first circuit breaker 134 and second circuit breaker 135. By operating the first and second circuit breakers the IED 143 can couple or decouple the locomotive generator and the power system. Accordingly, the IED 143 functions as a protective relay. In addition, IED 143 can provide control inputs to the power stage 136. For example, IED 115 can utilize synchrophasors to precisely synchronize the output of the power stage 136 with the operating levels of the power system 85. To utilize synchrophasors, IED 143 will need access to a precise time source, such as, for example, a GPS input, or another precise time source.

It will be appreciated that the system described in FIG. 10 can be configured with interface 130 mounted in an enclosure track-side, as illustrated in FIG. 2A, or mounted within a rail vehicle, as illustrated in FIG. 2B.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for increasing the reliability of an electric power transmission or distribution system using a mobile electric power source, comprising:
a mobile electric power source comprising a generator and configured to provide electric power to the transmission or distribution system using a transfer switch that is configured to selectively connect the mobile power source to the transmission or distribution system, the mobile electric power source being monitored and controlled using a first intelligent electronic device (IED) while coupled to the transmission or distribution system; wherein the first IED is configured to receive power system information from the electric power transmission or distribution system while the mobile electric power source is coupled to the transmission or distribution system and to provide control communications to the generator to match a frequency and a voltage of the generator to the electric power transmission or distribution system based on the power system information obtained from the electric power transmission or distribution system.

2. The system of claim 1, wherein the electric power transmission or distribution system is monitored by the first IED.

3. The system of claim 1, wherein the electric power transmission or distribution system is monitored by a second IED.

4. The system of claim 3, wherein the second IED comprises a phasor measurement unit (PMU) configured to calculate time-synchronized phasors and communicate the time-synchronized phasors to the first IED.

5. The system of claim 4, wherein the first IED is configured to calculate time-synchronized phasors from the information obtained from the mobile electric power source and perform control calculations based on the time-synchronized phasors.

6. The system of claim 1, wherein the control communications comprise communications to modify the frequency of the generator.

7. The system of claim 1, wherein the mobile electric power source comprises a diesel locomotive engine.

8. The system of claim 1, further including a connection car, wherein the first IED and the transfer switch are housed within the connection car.

9. The system of claim 1, wherein the first IED is configured to:
calculate a frequency of the electric power transmission or distribution system;
calculate a frequency of electric power generated by the mobile electric power source; and
control the mobile electric power source such that the frequency of the electric power generated thereby matches the frequency of the electric power transmission or distribution system.

10. The system of claim 1, wherein the IED is further configured to monitor the transmission or distribution system to determine a reactive power requirement and to operate the mobile electric power source to satisfy the reactive power requirement.

11. The system of claim 10, wherein the control communications comprise communications to modify the excitation of the generator to satisfy the reactive power requirement.

12. A peaking power system comprising:
a mobile electric power source including a diesel engine coupled to a generator, the generator providing a three-phase AC output through a first plug;
a connection system coupled to the first plug by a power distribution cable, the connection system including a second plug coupled to an input of a first circuit breaker, an input of a rectifier coupled to an output of the first circuit breaker, an input of a DC chopper coupled to an output of the rectifier, an input of an inverter coupled to an output of the DC chopper, an input of a power transformer coupled to the inverter, an input of a second circuit breaker coupled to an output of the power transformer, and a third plug coupled to an output of the second circuit breaker, the third plug adaptively coupled to a power system;
the power transformer configured to transform an output of the power inverter to a power system level;

the connection system further including an intelligent electronic device coupled to the first circuit breaker and the second circuit breaker, the intelligent electronic device further monitoring a first voltage level at the input to the first circuit breaker, a second voltage level at the input to the second circuit breaker, and a third voltage level at the output of the second circuit breaker; and the intelligent electronic device operating to control the generator to match the frequency and voltage of the power system and to operate the first circuit breaker and the second circuit breaker to connect the mobile electric power source to the power system after an electrical output of the transformer matches the frequency and voltage of the power system, the intelligent electronic device further operating to isolate the connection system from the power system based on the first, second and third voltage levels;

wherein the intelligent electronic device monitors the mobile electric power source while the mobile electric power source is coupled to the transmission or distribution system and selectively disconnects the mobile electric power source upon the occurrence of a condition.

13. The peaking power system of claim 12 wherein the connection system is a connection car.

14. The peaking power system of claim 12 wherein the connection system is a connection facility.

15. The peaking power system of claim 12 further comprising a second intelligent electronic device disposed remote from the first intelligent device, the second intelligent electronic device monitoring a power system level, the second intelligent electronic device in communication with the first intelligent electronic device and communicating the power system level to the first intelligent electronic device.

16. The peaking power system of claim 15 wherein the first and second intelligent electronic devices further include separate precise time sources, and wherein the monitored power system level is a synchrophasor.

17. The system of claim 12, wherein the rectifier, the DC chopper, the inverter, and the transformer comprise a power stage, and the condition comprises one of the generator is failing to produce power usable by the power stage and the power stage failing to produce power usable by the power system.

18. The system of claim 12, wherein the IED is further configured to monitor the transformer while the mobile electric power source is coupled to the power system and to selectively disconnect the mobile electric power source from the power system in connection with a transformer protection function.

19. The system of claim 12, wherein the IED is further configured to communicatively couple to a SCADA system and to provide information to the SCADA system relating to the operation of the transformer.

20. A mobile electric power source operable to provide electrical power to power system, the mobile electric power source comprising:

a generator configured to produce electrical power;
an engine coupled to a generator, the engine configured to provide mechanical energy to operate the generator;
a power transformer in electrical communication with the generator and configured to transform an output of the power generator to a power system level;
an intelligent electronic device (IED) configured to monitor electrical conditions associated with the generator, the transformer, and the power system while the generator is in operation; and
a connection system configured to selectively electrically couple the generator to the power system, the connection system comprising a breaker configured to be actuated by the IED;

wherein the IED is configured to control the generator to match the frequency and voltage of the power system and to actuate the breaker to connect the mobile electric power source to the power system after an electrical output of the transformer matches the frequency and voltage of the power system; and wherein the IED is configured to actuate the breaker to disconnect the mobile electric power source in response to a protective condition.

* * * * *